United States Patent [19]
McMahon

[11] Patent Number: 5,208,692
[45] Date of Patent: May 4, 1993

[54] HIGH BANDWIDTH NETWORK BASED ON WAVELENGTH DIVISION MULTIPLEXING

[75] Inventor: Donald H. McMahon, Carlisle, Mass.

[73] Assignee: Digital Equipment Corporation, Maynard, Mass.

[21] Appl. No.: 738,665

[22] Filed: Jul. 31, 1991

Related U.S. Application Data

[63] Continuation of Ser. No. 373,160, Jun. 29, 1989, Pat. No. 5,043,975.

[51] Int. Cl.$^5$ ................ H04J 14/02; H04B 10/20
[52] U.S. Cl. ................................ 359/128; 359/118
[58] Field of Search ............ 359/118, 117, 124, 125, 359/128–130, 139; 385/17, 37; 370/49.5, 57

[56] References Cited

U.S. PATENT DOCUMENTS

| | | | |
|---|---|---|---|
| 4,821,255 | 4/1989 | Kobrinski | 359/128 |
| 4,873,681 | 10/1989 | Arthurs et al. | 359/124 |
| 5,043,975 | 8/1991 | McMahon | 359/128 |

Primary Examiner—Edward L. Coles, Sr.
Assistant Examiner—Kinfe-Michael Negash
Attorney, Agent, or Firm—Kenyon & Kenyon

[57] ABSTRACT

A network interconnection architecture for a plurality of nodes uses sets of grouped node connections which form a plurality of node groups. A central electrically passive interconnection hub is coupled via a signal transmission path to each node group to establish a full mesh coupling between each of the plurality of node groups. An input and output matrix switch along with a pair of 1×N multiplexers are also coupled to each of the plurality of node groups and the hub multiplexer via the signal transmission path. The architecture can be further extended to encompass other networks with electrically passive hubs using a sandwich coupling of a matrix switch between two wavelength multiplexers.

19 Claims, 13 Drawing Sheets

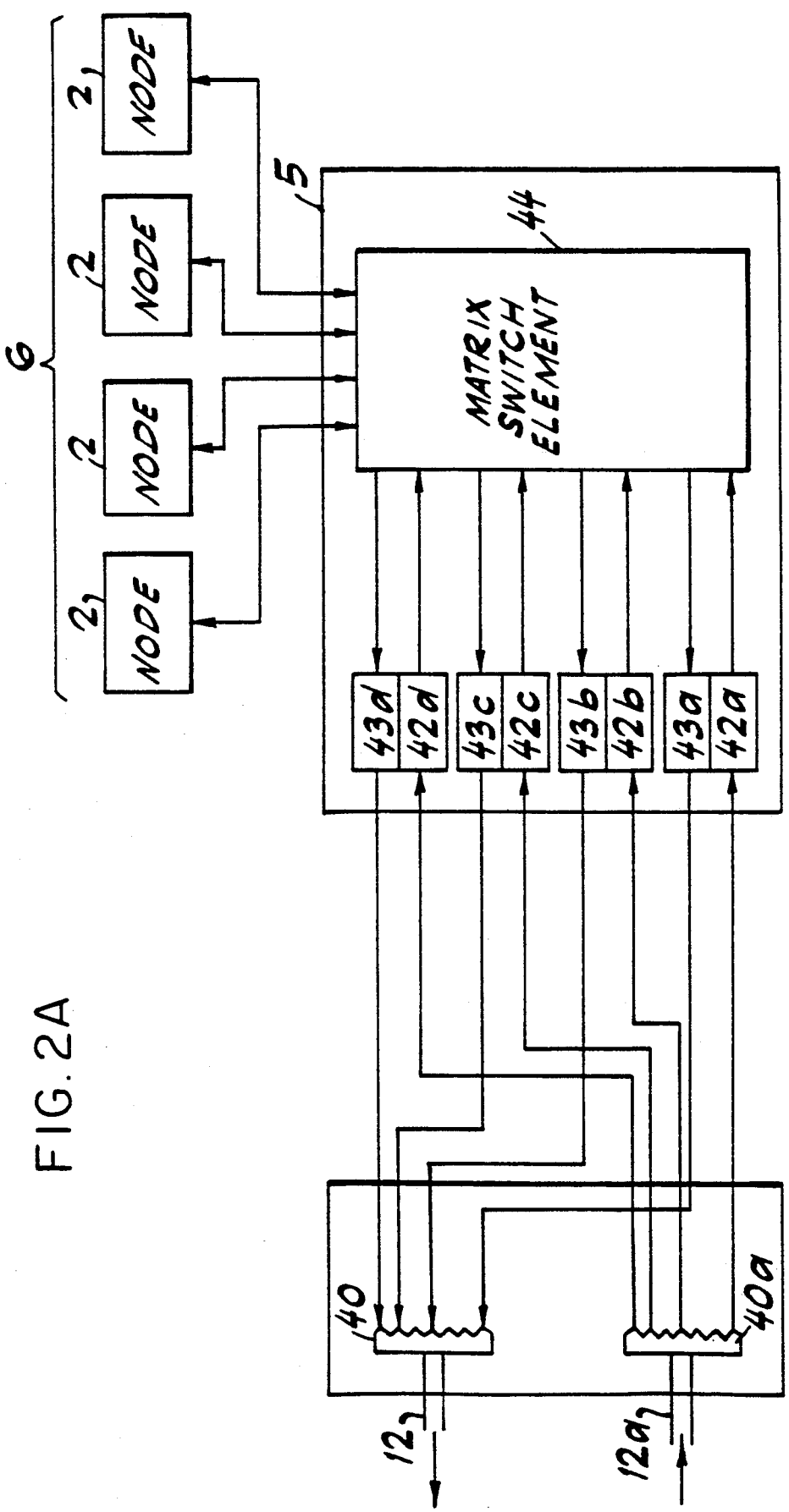

FIG. 7A
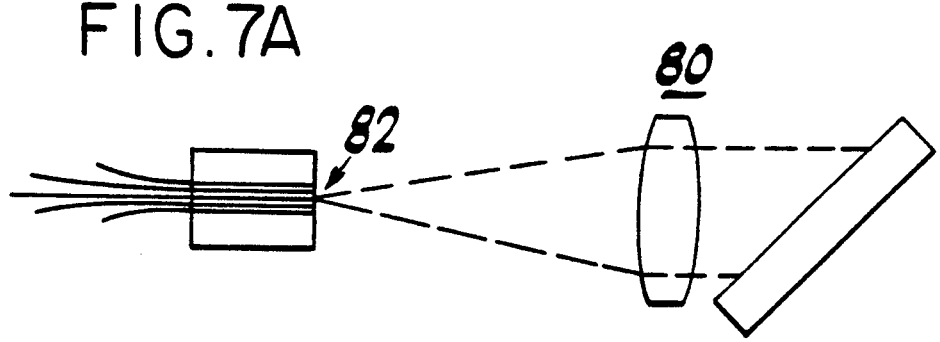
FIG. 7B
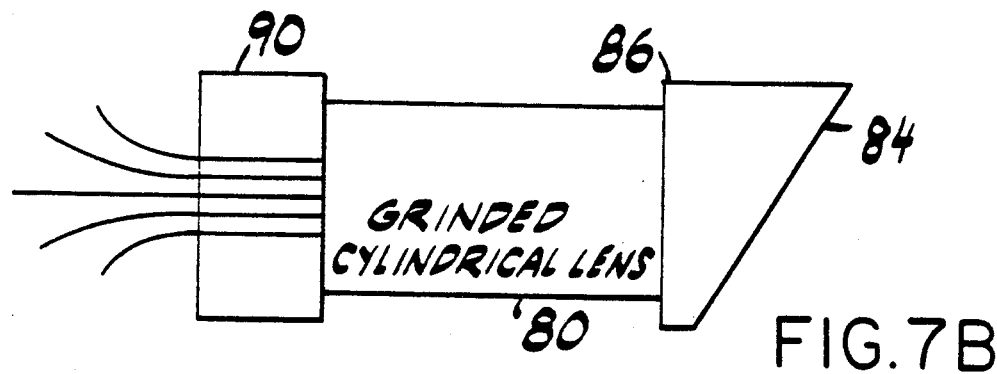
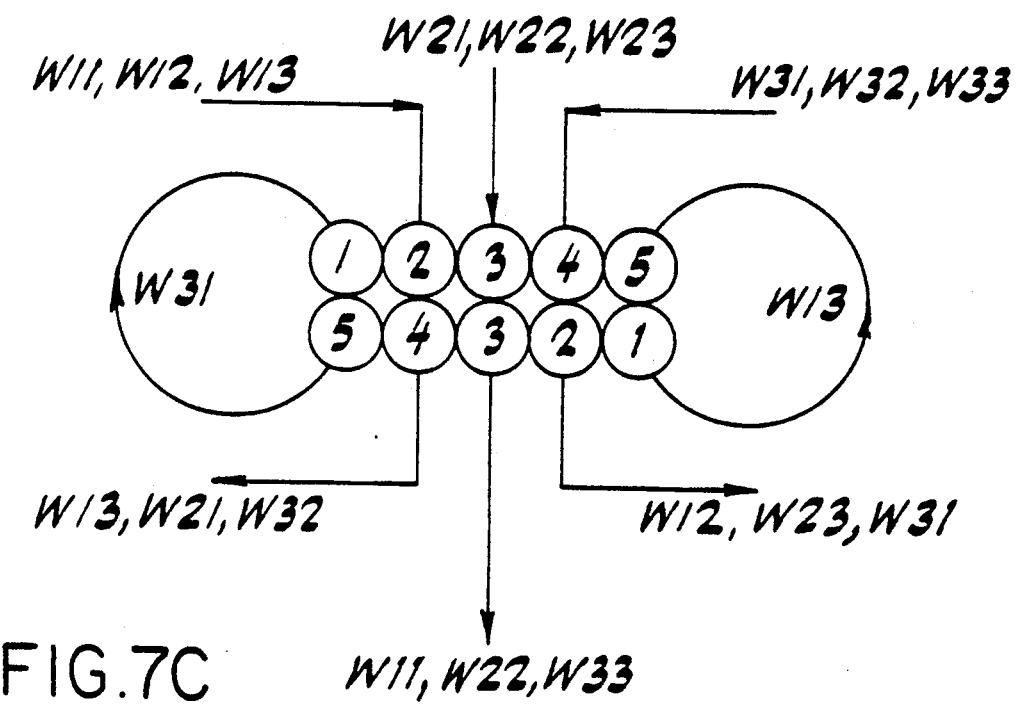
FIG. 7C

BIREFRIGENT PRISM

SPLIT DIFFRACTION GRATING

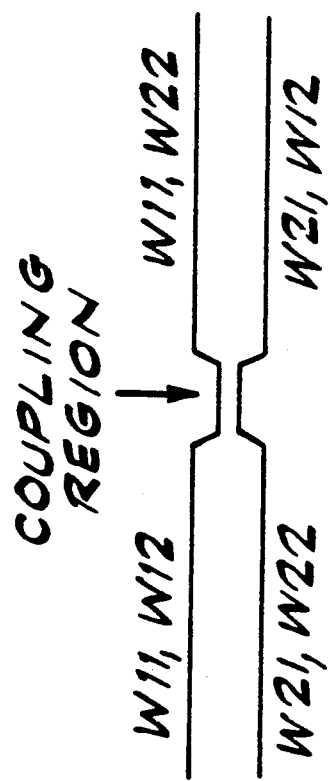

HIGH BANDWIDTH NETWORK BASED ON WAVELENGTH DIVISION MULTIPLEXING

This application is a continuation of application Ser. No. 07/373,160, filed Jun. 29, 1989, now U.S. Pat. No. 5,043,975.

FIELD OF THE INVENTION

This invention relates to a high bandwidth area network to provide intercoupling between a plurality of nodes. More particularly, the invention uses high bandwidth, fiber optic technology to establish a network having groups of nodes coupled to each other through a central hub.

BACKGROUND OF THE INVENTION

It is well known to implement complex communication networks solely from electronic routing circuitry and point-to-point optical links. Further, long distance telephone networks use relatively long, heavily multiplexed, high bandwidth, point-to-point links to provide an economical solution for communication networks due to the concurrent and non-concurrent time sharing use of transmission and exchange facilities.

Typically, the traffic handled by telephone networks has a long duration compared with the necessary set-up time for making the circuit connection. On the other hand, computer networks have a burst transmission nature. Therefore, computer interconnects are implemented to have instantaneous access to a total available bandwidth much larger than is used for digital telephone transmissions.

Because computers transmit short messages compared to the telephone circuit connection time, computer oriented communications networks provide a different type of functionality than is offered by telephone networks. Particularly, if both the bandwidth and distance of a local area network (LAN) link is increased, the duration for "launching" a message or packet occupies a small time period compared to that for propagation of this message from one end of a link to the other.

For example, a one thousand bit packet on a 1 Gbs link can be launched in 1 microsecond. Conversely, light requires 5 microseconds to propagate 1 km in a fiber. Thus, if a data source node waited for an acknowledgment of receipt of the data before launching additional data, a total elapsed time of 10 microseconds is required before additional data is launched. Therefore, the effective data rate is not 1 Gbs, but only 100 Mbs. Further, if more than one data source node is connected to that same link (for cost sharing purposes), the connection arbitration procedures for link use would occupy an additional time period, thus further reducing the effective use of the link capacity. Consequently, any LAN using link capacities higher than 1 Gbs and link distances longer than 1 km must adhere to store and forward procedures to avoid reducing the channel utilization efficiency due to the short launch time and relatively long propagation time.

Because area networks have many transmitter/receiver locations (nodes) rather than just two end points as in a point-to-point long distance telephone link, a problem arises in the interconnections between the nodes. A variety of architectures are known for sharing transmission facilities and connecting several nodes to a network. These architectures include, for example, full mesh, partial mesh, bus, passive star, active star, passive ring, active ring, central matrix switch, etc. However, all of these architectures encounter various problems in their implementation.

One such architecture where all nodes are coupled to a central point is the central matrix switch, which is used as an active hub to interconnect all nodes. The matrix switch provides multiple path connectivity between switch inputs and outputs and hence offers a network capacity greater than the capacity of an individual link. When the switch inputs are buffered, the matrix switch offers a means for connecting switches to switches and thus for creating fiber optic wide area networks (WANs). The wide area networks have good distance-bandwidth scalability because the central matrix switch can operate in the classical store and forward mode through the use of dedicated point-to-point links. The critical role of the node as a failure point is ameliorated by using redundancy procedures. Using conventional techniques, the matrix switch appears to be the best conventional approach for creating high bandwidth "backbone" networks, i.e., networks spanning distances of more than one kilometer with bandwidths in excess of 1 GHz.

However, the central matrix switch based fiber optic network has several problems. First, twice as many fiber optic links as communication channels are necessary, i.e., one link to carry data from a source node to the central matrix switch and a second link to carry data from the central matrix switch to the receiving node. Second, the central matrix switch approach does not alleviate the cost of the transmission plant i.e., the amount of cabled fiber, connectors and associated installation cost.

Another architecture uses a passive optical star coupler to interconnect the nodes. By using a separate optical frequency for each node, similar advantages as in the central matrix switch architecture are obtained. If there are as many nodes as there are inputs to the matrix switch, then that number or concurrent messages can be transported. The optical star coupler network is also similar to the matrix switch architecture in that each fiber carries only a single signal from a node to the passive star and only uses a single signal at a time from the passive star to the receiving node. The optical star network, however, uses a reliable passive hub approach which requires less optical sources than in the matrix switch architecture. However since all signals are broadcast to all receiver locations, full connectivity requires a total number of receivers equal to the square of the number of nodes. Each receiver continually monitors the network at a particular frequency, collects messages destined for its host location and drops all other messages. A serious disadvantage of the optical star architecture is that if the number of nodes is large, the inventory of receivers required to support the network goes well beyond the present commercial capabilities of the marketplace. Therefore, there is needed an architecture to achieve an actual reduction in fiber cable costs through wavelength multiplexing, to reduce the number of transmitters and receivers to be equal to the number of nodes, to reduce the number of discrete wavelength transmitters required, and to have a reliable electrically passive hub.

The matrix switch and optical star architectures provides parallel capacity equal to the bandwidth times the number of nodes and an efficient use of the optical links because of localized contention arbitration. However, the matrix switch architecture requires twice as many optical transmitters and receivers for a full load network capacity, and has an electrically active hub that is a central failure point. The optical star architecture requires many more receivers than nodes and a large number of different wavelength optical transmitters.

SUMMARY OF THE INVENTION

The present invention solves the above and other problems by organizing the network into N groups of N nodes each and providing an optically coupled WDM network capable of transmitting information from a first node through an electrically passive hub to any other selected node. In effect, the network provides full mesh connectivity between node groups. For this purpose, an electrically passive wavelength selective optical signal distribution hub arrangement is used to interconnect node groups. There are N groups, each having N nodes, and the system uses only N wavelengths of light rather than the N wavelengths normally required. However, the number of nodes in a group can be different than the number of groups or wavelengths of light.

The invention provides intercoupling of the node groups through a centralized hub. Each group is capable of sending N signals to the hub in a wavelength division multiplexed manner. In one embodiment, the hub demultiplexes the multiplexed signal, each carrying a separate information signal. These separate wavelengths from a single group are dedicated to different groups by the hub, so that there are dedicated point-to-point couplings between one group and each of the other groups.

Because of the use of a centralized hub coupled to groups of nodes along with the use of wavelength multiplexing to couple node groups to the hub, the number of optical fibers that are needed for providing node connections is greatly reduced. The reduction is due to the fact that each node does not have to be individually coupled over a relatively long distance through a centralized hub using separate pairs of optic fibers. (A pair of optic fibers are needed to provide simultaneous transmission and reception.) Instead, a number of nodes are coupled as a group using relatively short connections, which can be either electrical or fiber optic. The group is then coupled over a single pair of optic fibers to a centralized hub. If there are four nodes in a group, for example, the number of optic fibers needed to couple these four nodes to the centralized hub has been reduced from eight fibers to two fibers by clustering the four nodes into a group along with the use of wavelength division multiplexing. Further, the clustering of the four nodes into a group allows the switching to be located at each group and the arbitration to be localized at each group switch.

Since it is desirable to allow more than one node within the same group to communicate at the same time through the centralized hub to other nodes in different groups, some kind of sharing technique is necessary. One such technique used with fiber optic technology is wavelength division multiplexing. This type of multiplexing involves establishing separate communication channels at separate wavelengths of light. Thus, if four different nodes from one group want to transmit to other nodes in four different groups, the four different communications are assigned distinct wavelengths (i.e., channels) for transmission. These wavelengths are then multiplexed so that the four wavelengths are transmitted simultaneously over a single optic fiber. At the receiving end, the multiplexed signal is demultiplexed into the four separate channels. Each channel is routed to a different node by a matrix switch in accordance with source and destination information contained in the header of a data packet transmitted over the channel.

By combining the receiving functions of the group into a single entity, the number of receivers per node does not increase from the central matrix switch architecture of the prior art. However, since an incoming signal at any of the N wavelengths can be directed to any of the N nodes where N is the number of nodes in a group, a means, such as N×N matrix switch, must be provided to carryout the proper routing. Using N (N×N) dual matrix switches, while adding no more complexity than already present in the central matrix switch architecture, allows the hub of the present invention to be passive. This significantly increases the reliability of the network.

The present invention reduces the total number of optical transmitters and receivers in the system, while substantially maintaining the bandwidth performance of the central matrix switch. Further, the amount of optic fiber needed is greatly reduced for the present invention.

An embodiment of the hub of the present invention operates such that when light of wavelength (1) through light of wavelength (N) is transmitted into input port (1) of the hub, wavelength (2) emerges through output port (2) of the hub, and etc., so that wavelength (N) emerges through output port (N). However, when wavelengths (1) through (N) are transmitted into input port (2), then wavelength (1) emerges from output port (2), wavelength (2) emerges from output port (3) and etc., and wavelength (N) emerges from output port (1). That is, the incident wavelength emerges from the ports in a staggered fashion. Consequently, each optical output port carries an output beam having a light wave of a selected wavelength which is uniquely associated with a selected input port An apparatus having N input ports, N output ports, and capable of directing N wavelengths incident into the input ports to unique output ports, in a staggered fashion, is hereby termed a "transmultiplexer".

The architecture of the present invention provides a system in which nodes are clustered into groups and connected to the centralized hub (the transmultiplexer) via wavelength multiplexers. The nodes of a single group, for example four nodes, are coupled to a bidirectional (dual) matrix switch which converts electrical signals from the nodes into optic signals of different wavelengths. The optic signals from the nodes are coupled to a wavelength multiplexer which multiplexes the four signals having different wavelengths into a single light signal. This single light signal is then sent to the transmultiplexer which directs the wavelengths, in a staggered fashion, to the correct receiving node group.

The present invention provides several embodiments of the transmultiplexer, which may be of the transmission type shown for example in FIG. 6 or of the reflective or "Littrow" type shown for example in FIGS. 7A-7B, used as the centralized hub of the system. One embodiment uses a plurality of pairs of wavelength multiplexer/demultiplexers, each pair being coupled to a different group of nodes. The demultiplexer is coupled to receive a multiplexed signal from an associated group, and will demultiplex the incoming signal from that group into a number of wavelengths. Each of these distinct wavelengths is coupled to a different one of the remaining groups in the network. Similarly, the multiplexer of the multiplexer/demultiplexer pair in the transmultiplexer will receive a different wavelength from each of the different groups in the system. The multiplexer will then multiplex these separate signals received at different wavelengths into a single multiplexed signal that is then sent to the group of nodes that is associated with that particular multiplexer.

Another embodiment of the present invention uses a grating multiplexer with collimating lenses on either side of the grating. Input signals are received in three input fibers and pass through the grating from where they are sent to different output fibers. Multiple wavelengths on different input fibers typically results in output light signals being sent in directions that are not captured by the output fibers, if the same number of output fibers are provided as input fibers. Therefore, the present invention provides additional output fibers which capture the output light signal which would otherwise be lost. The additional output fibers reroute the captured output light signal back through the grating such that the light signals that are fed back through the grating are received by one of the output fibers.

Another embodiment of the present invention uses 2×2 couplers. In such a coupler having two fibers, each of which carries two different wavelengths, the first wavelength in each of the fibers will pass through the coupler and stay in its respective fiber By contrast, the second wavelength in each fiber is transferred (or "cross coupled") from one fiber to the other fiber. Therefore, after the coupler, each fiber will contain one wavelength from its own fiber and a second wavelength from the other fiber. Using a plurality of 2×2 couplers, a larger sized (such as 16×16) transmultiplexer can be provided.

The architecture of the present invention provides the system with a centralized hub that is both economical and reliable, since it does not use active elements (i.e., is passive). The passive hub of the present invention avoids the loss in optic power experienced with the passive star coupler so that communication between nodes is more reliable. The link distance between groups of nodes is therefore limited only by multiplexer and fiber losses.

The architecture of the present invention further provides an N×N connectivity between $N^2$ transmitting/receiving nodes or between N (N×N) matrix switches or any combination thereof. This architecture only requires N distinct wavelength optical sources. Using the N×N transmultiplexer provides an optically efficient, reliable, passive hub interconnect between distributed matrix switches associated with groups of nodes.

An advantage of the present invention is a large reduction in optical transmitter/receiver costs and reduction in cabled fiber costs.

The present invention still further provides the following advantages: reliable, passive hub with indirect, redundant routing in case of component failures; a communication capacity equal to the number of wavelengths times the number of nodes times the bandwidth; full mesh connectivity between node groups; contention free optical interconnect allowing groups of nodes to be located many kilometers from one another; no distance and bandwidth scaling problems due to store and forward mode of operation; true optical routing directing all optical signals to intended node groups; and extendable network capacity.

BRIEF DESCRIPTION OF THE DRAWINGS

FIG. 2a is a block diagram showing in more detail an individual group of the network system of FIG. 2.

FIG. 7A illustrates schematically the operation of a grating transmultiplexer using a Littrow mount.

FIG. 7B shows a physical implementation of a Littrow mount transmultiplexer according to the present invention.

FIG. 7C is a schematic diagram showing an embodiment of the routing of signals according to the present invention using a Littrow mount structure.

FIG. 7G schematically illustrates the operation of the Littrow mount structures of FIGS. 7E and 7F.

FIG. 7H is a schematic representation of a 2×2 coupler usable as a transmultiplexer in the present invention.

DETAILED DESCRIPTION

Figure 1:
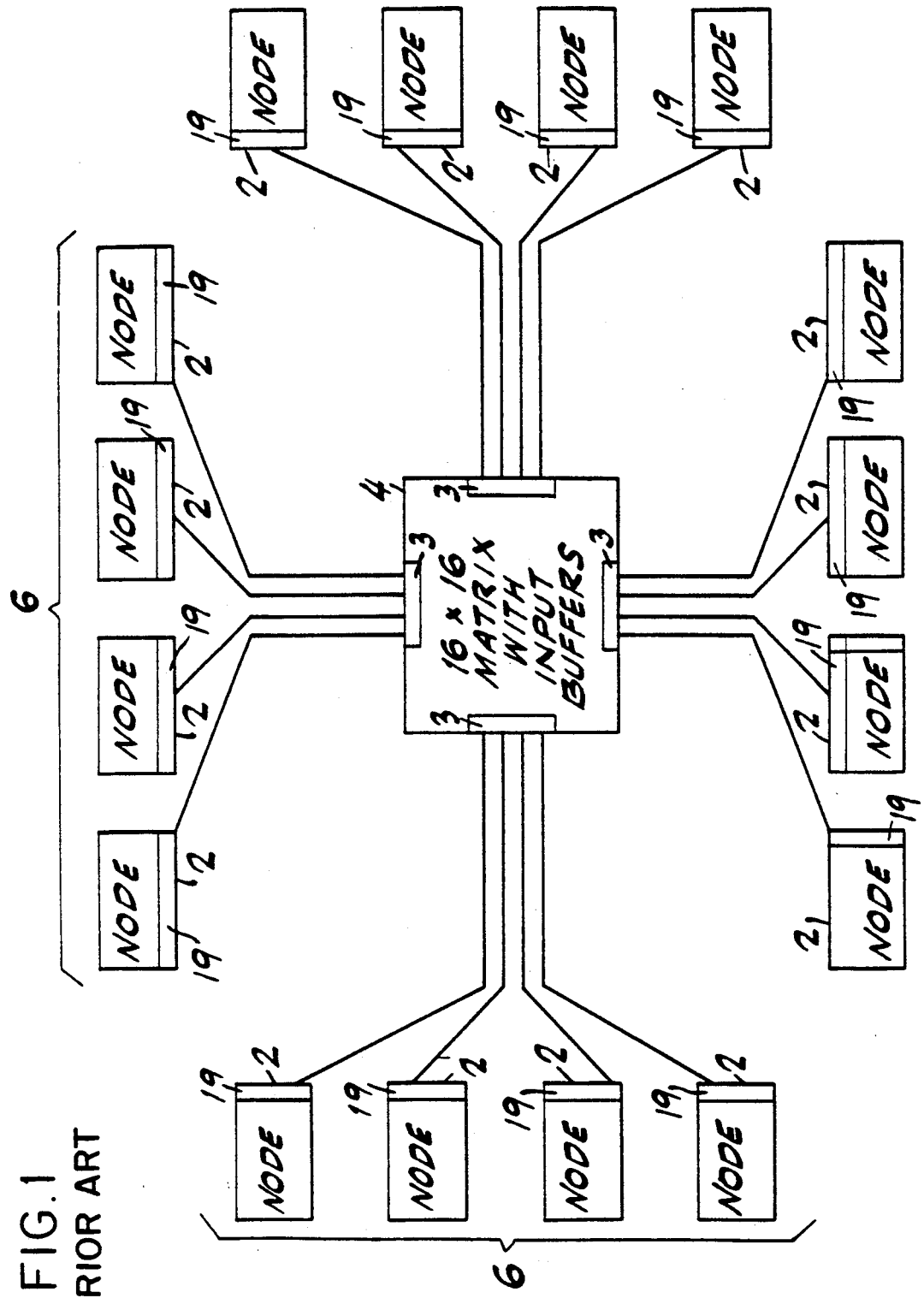
FIG. 1 is a block diagram of a prior art system using a 16×16 matrix as a centralized hub.

The block diagram of FIG. 1 illustrates an example of a known architecture including a central 16×16 matrix switch 4 having transmitter/receiver sections 19 coupled to the switch 4 are a plurality of nodes 2. Each node further includes a transmitter/receiver section 3 for coupling optical signals with the transmitter/receiver sections 19 of the central matrix switch 4 via fiber optic cables.

Figure 2:
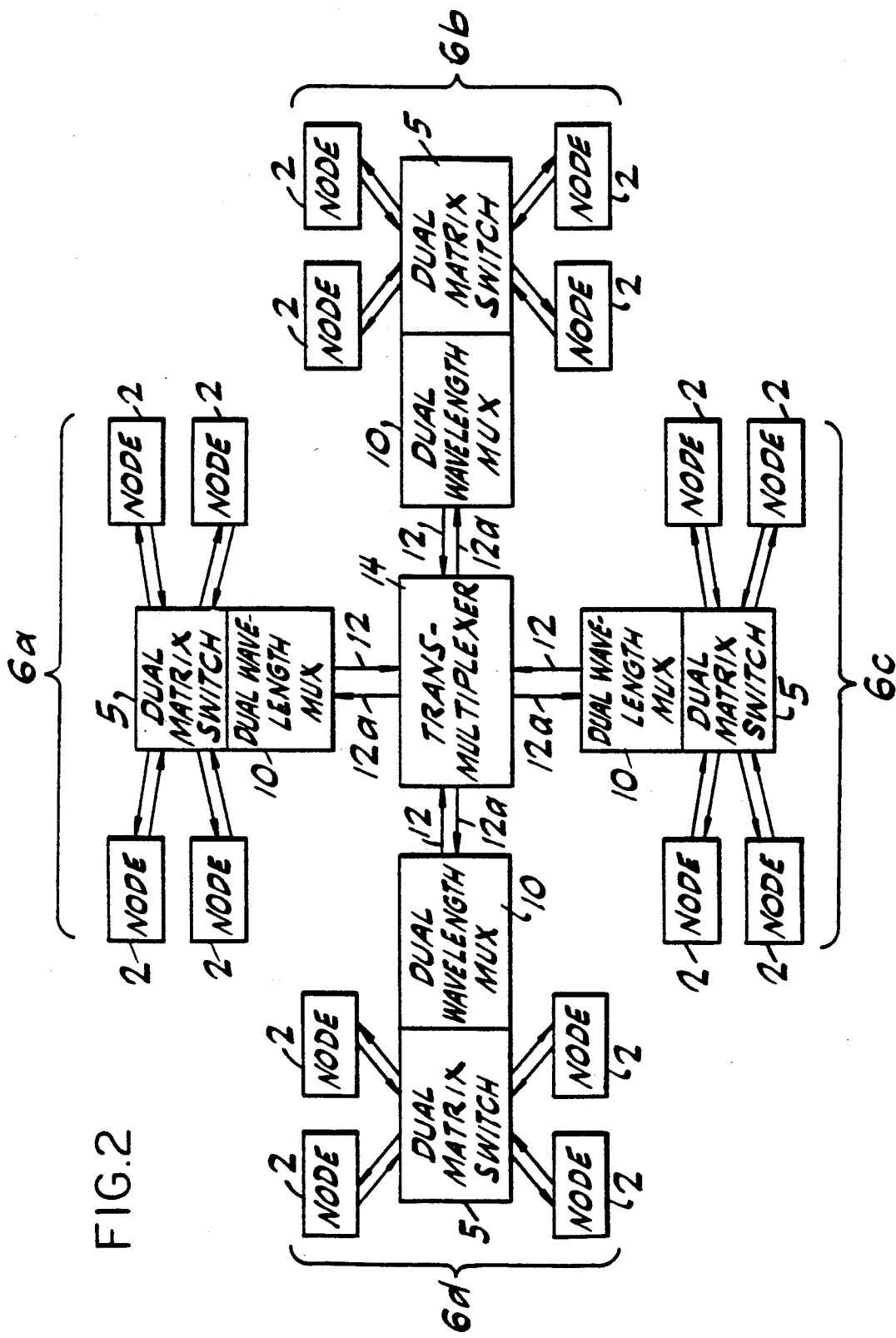
FIG. 2 is a block diagram of a network system using a transmultiplexer as the centralized hub according to the present invention.

FIG. 2 illustrates a network constructed in accordance with an embodiment of the present invention that provides a transmultiplexer 14 that provides point-to-point coupling between one node group and any other node group. In the illustrated embodiment, a plurality of groups 6a–6d of nodes 2 are coupled to the transmultiplexer 14 by a dual fiber path 12, 12a. The nodes 2 of a single group are electrically or fiber optically connected, for example, to a dual matrix switch 5. The dual matrix switch 5 in turn is coupled to a dual wavelength division multiplexer 10 that transmits and receives multiplexed signals to and from the transmultiplexer 14 via a pair of optic fibers 12, 12a. The operation of the dual wavelength multiplexer 10, the dual matrix switch 5, and the nodes 2 for a single group is described below in FIG. 2a.

A more detailed diagram of the groups 6a–6d is shown in FIG. 2a. The dual (bi-directional) wave division multiplexer 10 contains a multiplexer 40 coupled to transmission optic fiber 12. A demultiplexer 40a is coupled to the receive optic fiber 12a and receives multiplexed signals from the transmultiplexer 14.

The demultiplexer 40a demultiplexes the received multiplexed information signal into a plurality of light signals at different wavelengths. Each wavelength is directed to a separate receiver 42a–42d. Each receiver 42a–42d receives one light signal at a specified wavelength, and converts this light signal into electrical signals which is then fed through a storage buffer (not shown) to a matrix switch element 44. Each separate electrical signal received in the matrix switch element 44 contains source and destination information in the header of a data packet of the information signal received from the source node. This source and destination information is used by the matrix switch element 44 to correctly route the information signal on a specific wavelength to one of the nodes 2 coupled to the matrix switch element 44.

The transmission from a node 2 of a group follows a similar path through the matrix switch 5 and the dual wavelength division multiplexer 10. A node 2 which wishes to communicate with a node 2 in another group must arbitrate for the use of the channel (or wavelength) dedicated for communication to that other group. This arbitration is localized among the nodes within a single group since each group is separately coupled to each of the other groups or separate wavelengths. Once arbitration has been accomplished such that the node 2 is assigned a specific wavelength for transmission, the matrix switch element 44 will couple the node 2 to the correct transmitter 43a–43d that converts the electrical signal from the node 2 into a light signal of a specified wavelength. The light signals from transmitters 43a–43d are provided to the multiplexer 40 which performs wavelength division multiplexing. The multiplexed signal is then sent over optic fiber 12 to the transmultiplexer 14.

As stated earlier, the present invention dedicates separate wavelengths transmitted in multiplexed fashion from one group to the other groups. In other words, one wavelength of the multiplexed signal transmitted from group 6a is dedicated to transmission to group 6b, while a second wavelength transmitted from group 6a is dedicated to transmission with group 6c. Any single node from group 6a can communicate with any one node from any of the groups 6b, 6c or 6d. However, two or more nodes from the same group 6a can also communicate simultaneously to separate nodes in separate groups over different wavelengths. For example, a first node in group 6a can communicate with any node of group 6b on wavelength 1, while a second node of group 6a communicates with any node of group 6b on wavelength 2. Also two or more nodes in the same group can receive signals from two different groups, with the data packet containing the source and destination information needed for the matrix switch element to route the signals to the nodes.

This dedication of one wavelength between each group prevents two nodes from one group communicating at the same time with two nodes of another group. Therefore, arbitration for use of a wavelength (and therefore communication to a specific group) is needed. This is performed locally by the matrix switch 5 which arbitrates among the four nodes of a node group. The localization of arbitration to a node group is essential. This is because an arbitration scheme which arbitrates among all the nodes of the entire system has substantial distance related time delays and thus inefficient link usage.

An operation failure of a group localized dual matrix switch 5 in the architecture illustrated in FIG. 2 would most likely be caused by a power failure which in turn causes failure of all electronics at that same location. For example, a failure of the dual matrix switch 5 of group 6a does not affect communication among the other three groups 6b–6d. Such a localized failure has no effect on the communication between any of the other groups as long as they continue to receive power. Further, a failure of an individual component such as a single transmitter or receiver is circumvented (albeit at lower performance) by routing signals first to an intermediate node group which then routes the signal to the intended node group. This has the effect of bypassing the failed component.

Figure 3:
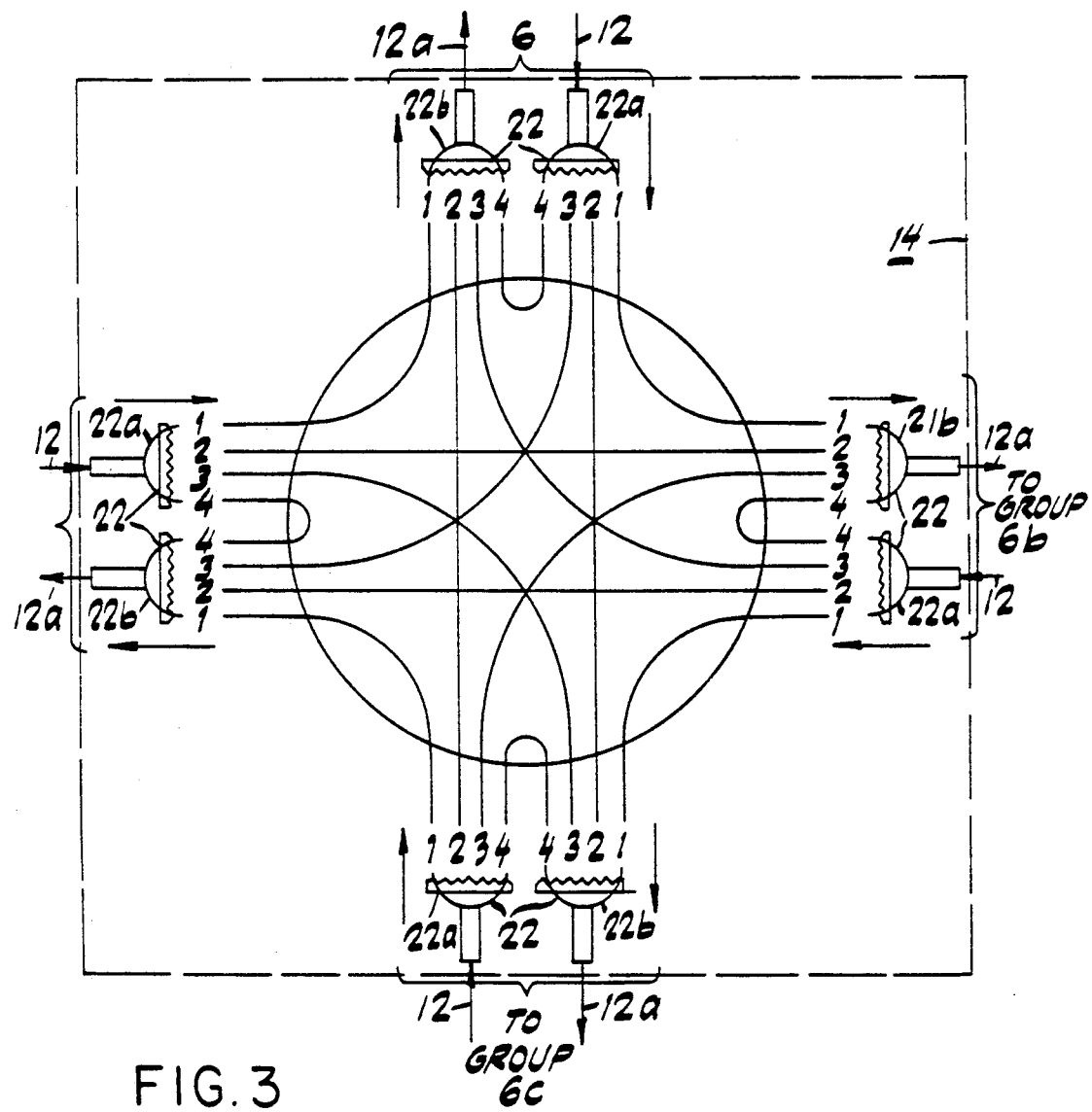
FIG. 3 is a schematic representation of a transmultiplexer usable in the system shown in FIG. 2.

An exemplary embodiment of a transmultiplexer 14 is illustrated in FIG. 3. The transmultiplexer 14 contains a plurality of wavelength multiplexer/demultiplexer pairs 22. One multiplexer/demultiplexer pair 22 is associated with each group 6a–6d. The demultiplexer 22a of the pair 22 receives incoming signals over optic fiber 12 from the wavelength division multiplexer 10. The demultiplexer 22a demultiplexes the multiplexed signal received from the group into four different wavelengths, representing four different information signals. Each of these wavelengths is provided to a different group. For example, wavelength 1 from group 6a is transmitted to group 6b, wavelength 2 is transmitted to group 6c, wavelength 3 is transmitted to group 6d, and wavelength 4 is transmitted back to group 6a. The transmission back of the wavelength 4 allows the nodes within a single group to communicate with each other.

In similar fashion, each multiplexer 22b receives a different wavelength from each of the groups (as well as itself). The multiplexer 22b multiplexes the four signals and sends the multiplexed signal over optic fiber 12a to the group 6.

Figure 4:
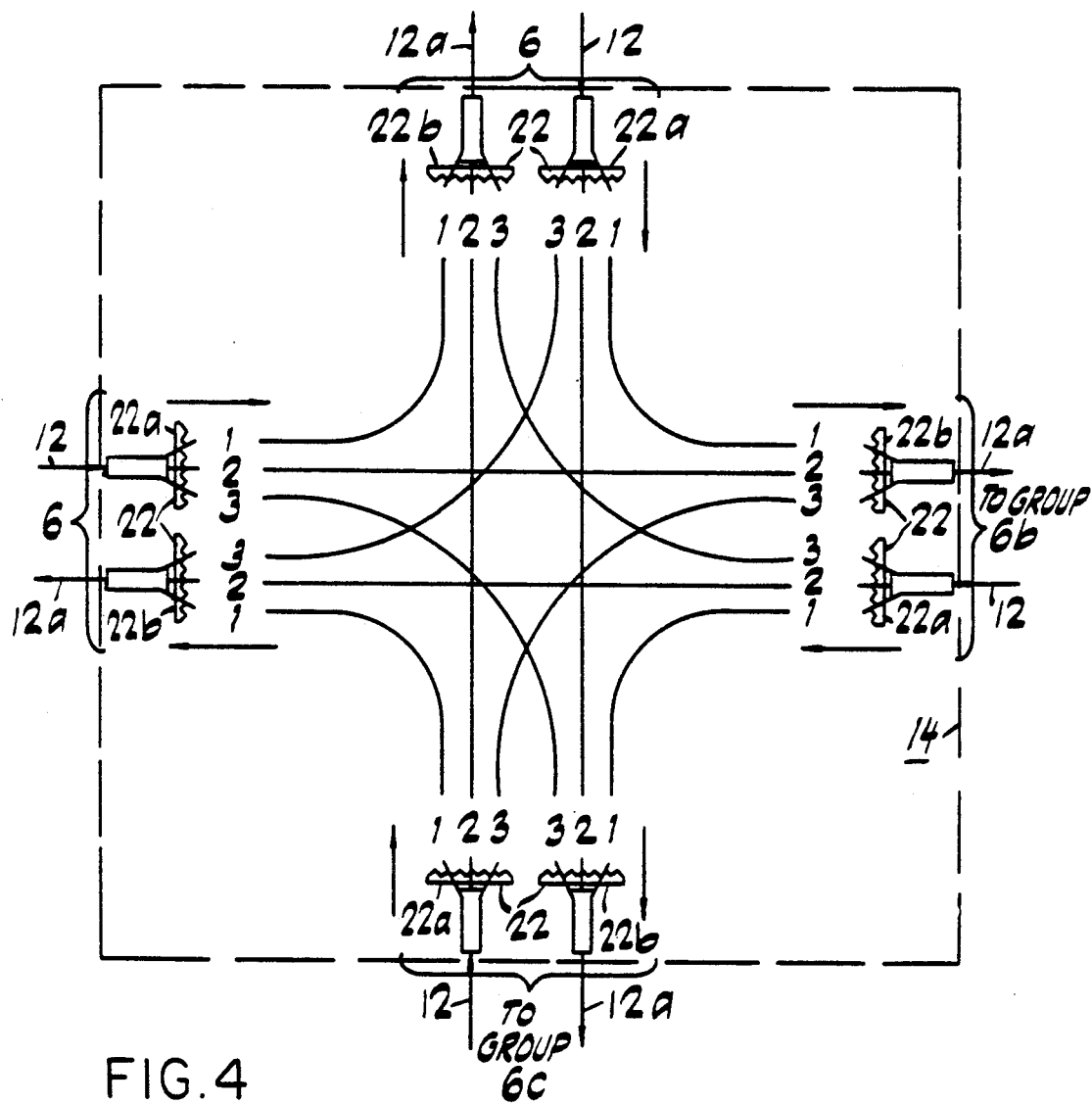
FIG. 4 is a schematic of another embodiment of the transmultiplexer of the present invention usable in the network of FIG. 2.
Figure 5:
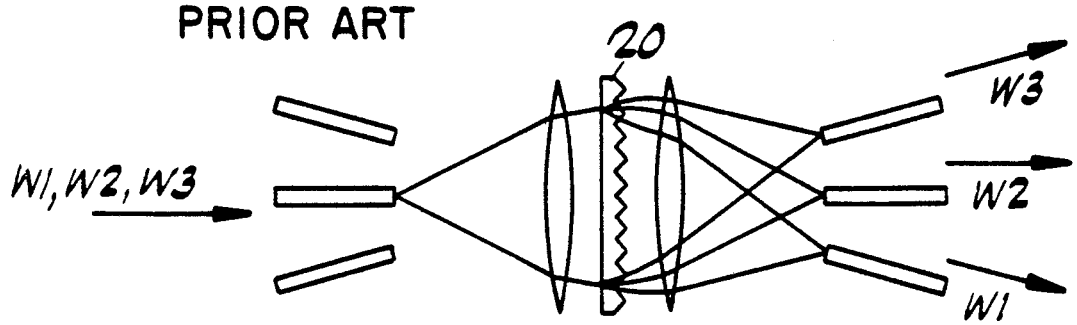
FIGS. 5, 5A and 5B illustrate the operation of a simple grating multiplexer.

Another embodiment of the transmultiplexer 14 similar to that of FIG. 4 is illustrated in FIG. 5. However, in FIG. 5, there is no route between the nodes of the same group 6. This is because it is more economical to provide for hard wiring of the individual nodes within a group, rather than providing for the extra physical components (such as an extra receiver 42a and transmitter 43a in each of the groups). Thus, only three wavelengths (1–3) are needed to interconnect four groups 6 of four nodes 2 each. It should be noted that the connectivity shown in FIG. 4 is equally viable independent of the number of nodes 2 per group 6. The interconnection of N groups of N nodes requires (N−1) distinct wavelengths and N pairs of multiplexer/demultiplexers in the transmultiplexer 14.

Figure 5A:
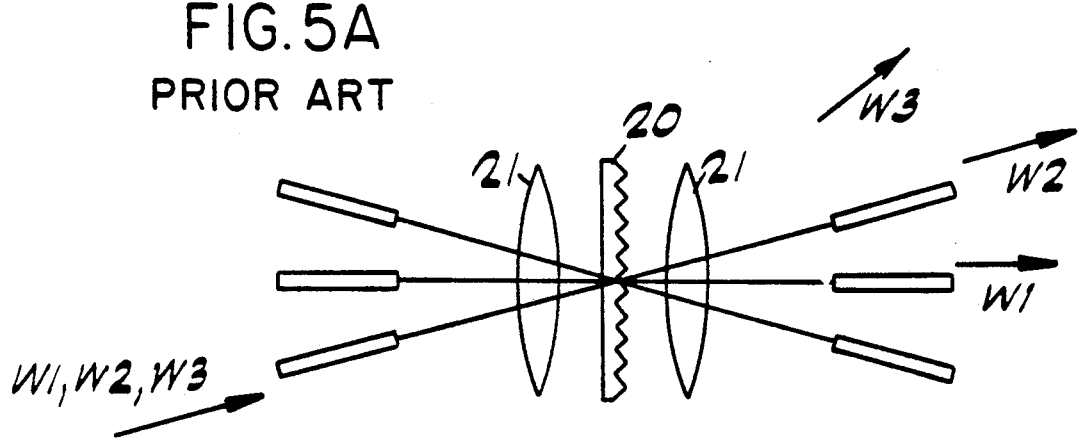
Figure 5B:
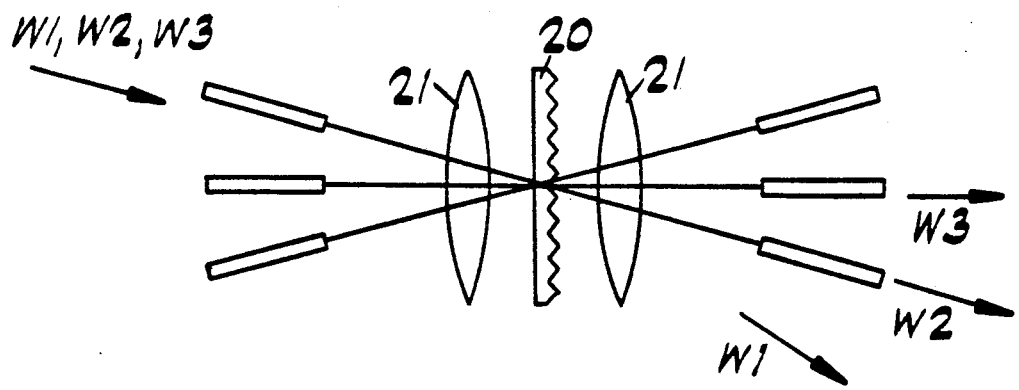

FIG. 5 shows schematically the operation of a prior art simple grating wavelength multiplexer 20 modified to have three inputs and three outputs. Lenses 21 are needed to collimate the light beam from the input port positions and to focus the light beam onto the output port positions as shown in FIGS. 5-5b. Using three inputs with three outputs inherently assumes that the three wavelengths are equally spaced from one another.

A simple grating wavelength multiplexer 20 as shown in prior art FIG. 5, which is modified to have both three inputs and three outputs, cannot perform like the transmultiplexer 14 shown in FIG. 4. The use of all wavelengths on different input fibers (FIGS. 5a and 5b) typically results in output light signals W3 (FIG. 5a) and W1 (FIG. 5b) being sent in directions that are not captured by any of the available three output fibers In other words, one of the wavelengths is lost.

Figure 6:
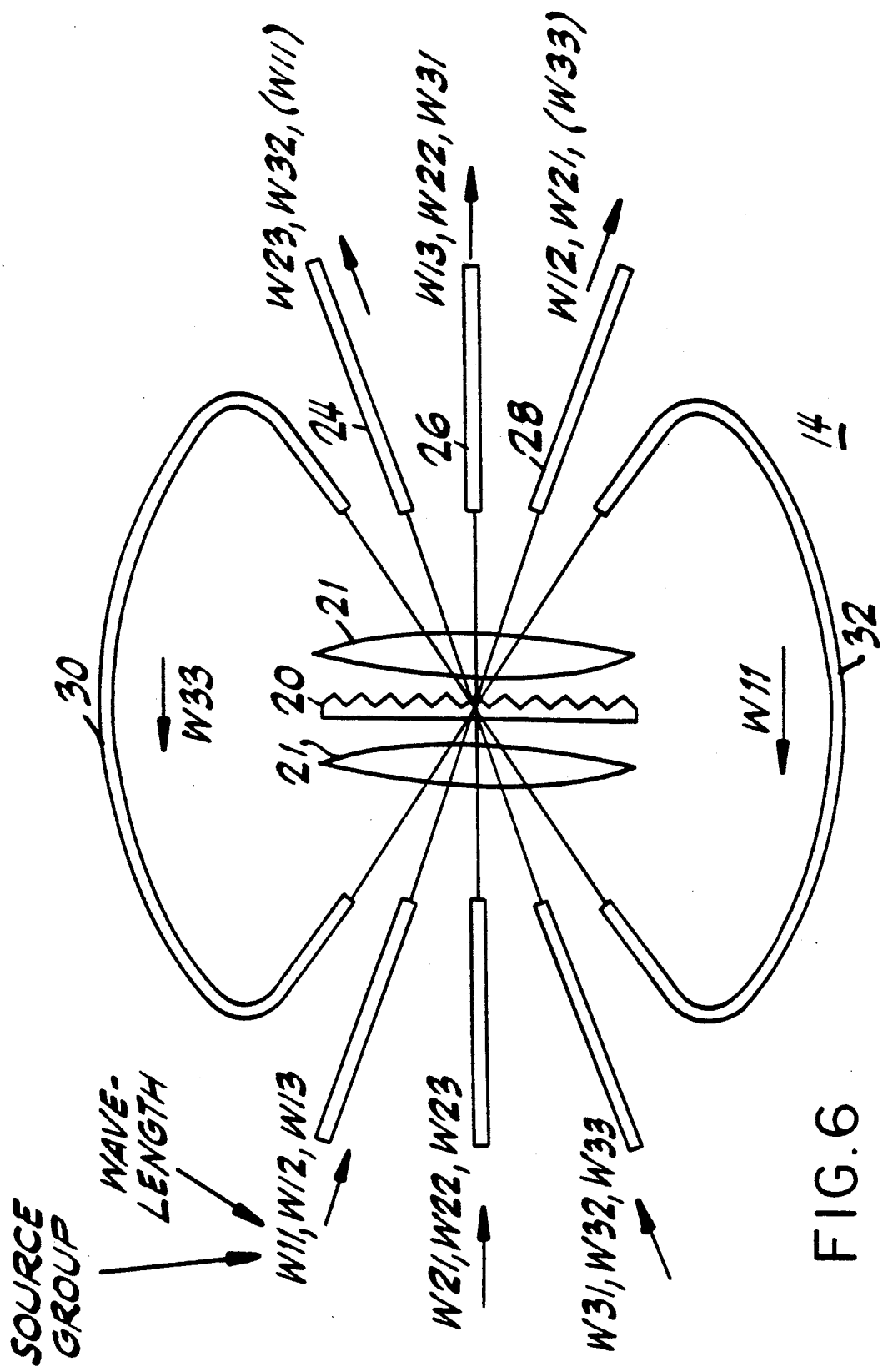
FIG. 6 is a schematic diagram of another embodiment of a transmultiplexer according to an embodiment of the present invention.

FIG. 6 illustrates a transmultiplexer 14 according to an embodiment of the present invention that modifies the simple grating wavelength multiplexer 20 to provide the necessary functionality of the transmultiplexer 14. The grating wavelength multiplexer 20 has collimated lenses 21 and includes additional fibers 30, 32 which capture output light beams W33 and W11 that are not directed into any of the three output fibers 24, 26, 28. The additional fibers 30, 32 return light beams W33 and W11 which are redirected through the grating 20 such that wavelength W33 will be captured by output fiber 28, while wavelength W11 is captured by output fiber 24. In this way, the necessary type of connectivity for the transmultiplexer 14 is provided.

Another embodiment of a transmultiplexer is constructed according to the present invention using what is commonly known as a Littrow mount. Such a mount is shown in FIG. 7A and has reference numeral 80. The use of the Littrow mount 80 eliminates the need for two separate lenses, such as shown in FIG. 6, to provide a more compact structure. In the Littrow mount device, light entering the device through an input fiber is collimated with a lens or concave mirror and then strikes the grating with different wavelengths bouncing off the grating at different angles. After passing back through the lens or mirror, each wavelength is refocused to a different spot on the fiber array. By proper placement of the input and output fibers, the Littrow mount may be used as the transmultiplexer 14 of the present invention.

A physical implementation of a Littrow mount useful as the transmultiplexer 14 is illustrated in FIG. 7B. The Littrow mount transmultiplexer is constructed using a diffraction grating 84 placed on the rear side of a glass prism 86. A grinrod solid cylindrical lens 80 is cemented to the prism 86, and a silicon block 90 is cemented to the opposite end of the grinrod lens 80. The block 90 contains a multiplicity of equally spaced, preferentially etched grooves into which fibers are placed and cemented such that the fiber ends lie flush with respect to the block surface lying against the grinrod lens 86.

The operation of the Littrow mount transmultiplexer 14 of FIG. 7B is explained with reference to FIG. 7C, which illustrates a schematic diagram indicating the placement of input and output fibers in the input/output image plane of the lens 80 The lines attached to the fiber ends depicted as numbered circles, are optical circuits that indicate the direction of light flow. For example, wavelengths W21, W22 and W23 enter the rear of the transmultiplexer 14 through input fiber #3. As discussed earlier, the first number index (the "2" in W21) refers to the group and the second number index (the "1" in W21) refers to a specific wavelength.

The action of the reflective diffraction grating is to reflect light of wavelength 2 through the center axis of the lens 80. In this case, the axis lies midway between input fiber 3. Due to the dispersion of the diffraction grating 84, wavelength 1 is displaced in the output plane one fiber to the left (#4) and wavelength 3 is displaced one fiber to the right (#2). If these three wavelengths were to enter the transmultiplexer 14 via input fiber #2, then the input beam position would be displaced one fiber to the left and the action of the reflective grating would be to displace the output fiber position one fiber to the right.

Essentially, the effects of diffraction and reflection are additive in nature such that wavelengths 1, 2 and 3 from input fiber #2 exit via output fibers #3, #2 and #1 respectively. Conversely, if light enters via input fiber #4, wavelengths 1, 2 and 3 exit via output fibers #5, #4 and #3 respectively. However, in the illustrated embodiment, light is input into the multiplexer on three inputs (fibers #2, #3 and #4) and the light is to be output on three outputs (fibers #4, #3 and #2) in order to perform the transmultiplexing function. Therefore, the wavelengths that are output on output fibers 1 and 5 must be rerouted (fed back) so that they will be output on the three output fibers #2, #3 and #4. In the example shown, light of wavelength 3 from input fiber #2 (W13) which exits via output fiber #1 is fed back to re-enter the transmultiplexer 14 via input fiber #5. Further, since input fiber #3 is three fibers to the right of fiber #2 (where the light originally entered the transmultiplexer 14), wavelength 3 (W13) exits the multiplexer 14 on its second pass three fibers to the left of output fiber #1, i.e., on output fiber #4. In the same manner, light of wavelength 1 (W31) from input fiber #4, exits via output fiber #5 on its first pass through the transmultiplexer 14, and reenters the transmultiplexer 14 via input fiber #1, and exits via output fiber #2 on its second pass. In this way, the Littrow mount is being used to operate in much the same manner as the grating wavelength multiplexer 20 of FIG. 6.

It should be recognized that the transmultiplexer structure of FIG. 7a is significantly simpler with much lower cost than the use of eight 1:3 multiplexers such as shown in the embodiment of FIG. 4, while achieving the same transmultiplexing effect.

The method described schematically in FIG. 7C functions properly only if the number of user input and output fibers is limited to two or three and if the number of additional fiber outputs to inputs is not greater than one at the end of each fiber array. For example, if there are five user input and output fibers, two additional fibers rerouted back to input fibers at each end, and five wavelengths of light, then using a modification of FIG. 7C, it can be shown that one of the five wavelengths entering on the second and fourth fibers does not enter the proper output fiber. The number of inputs not passed to the proper output fibers increases as one attempts to construct a multiplexer 14 having further additional wavelengths and additional input and output fibers.

The rerouting process within the transmultiplexer 14 must act modulo N (the number of wavelengths or the number of normal input or output fiber connections) measured in terms of the angular fiber spacing of additional output and additional input fiber locations relative to the desired input and output ports. Modulo N operation for more than three wavelengths is achievable according to the present invention, as described below.

An exemplary embodiment of a transmultiplexer 14 which is capable of multiplexing five wavelengths assumes that the transmultiplexer 14 uses a double row of fibers mounted at the input/output image plane and further has a geometry such that wavelengths 1, 2, 3, 4, 5, all entering the transmultiplexer input on fiber #1 will separately exit the transmultiplexer 14 on output fibers #1, #2, #3, #4, #5, respectively. The double row structure is not necessary, but limits the size of the image field and hence reduces lens aberrations. Using the additive reflection-diffraction effects, it is clear that each of these same five wavelengths entering the input fiber #2, which is displaced one fiber to the right with respect to input fiber 1, will exit on the output fibers displaced one fiber left of the same wavelengths that entered via input fiber 1. Similarly, the wavelengths entering via fibers #3, #4, and #5 will appear on output fibers displaced 2, 3, and 4, positions to the left of the input fiber #1 position.

Figure 7D:
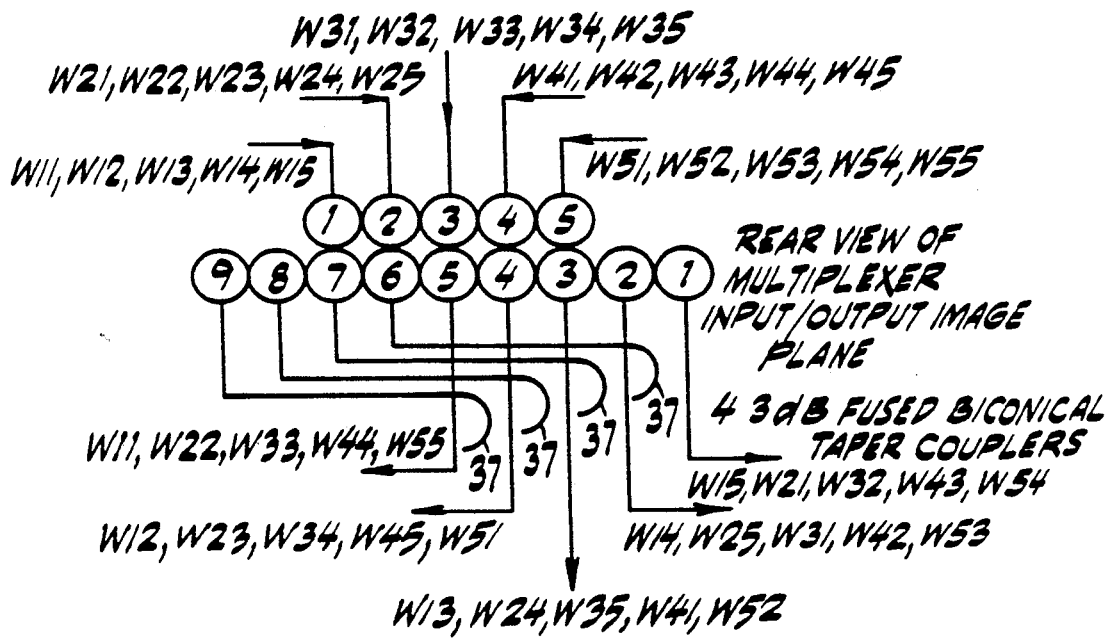
FIG. 7D is a schematic diagram showing a transmultiplexer according to an embodiment of the present invention.

The FIG. 7D structure of the present invention performs some of the re-routing operations required by a transmultiplexer 14. However, because of the displacement of output fiber positions caused by a corresponding inverse displacement of input fiber positions, light exits on a total of nine fibers rather than simply on only five fibers. However, the light exiting from four of the fibers (fibers #6, #7, #8 and #9) are simply summed with the outputs from fibers #1, #2, #3 and #4. Therefore, total output from fiber #1 is a combination of the output of fiber #1 and the output of fiber #6. The summing of light outputs from output fibers #1 and #6, #2 and #7, #3 and #8, #4 and #9 produces the required transmultiplexer action since light addition is effective modulo displacement of five output fibers, i.e., the number of fibers used as inputs.

Rather than requiring two separate fibers to transmit light signals to remote locations, FIG. 7D shows the use of four fused biconical taper fiber couplers 37 used a 50%-50% intensity splitters. These couplers share the light from both input fibers between both of the output fibers.

Figure 7E:
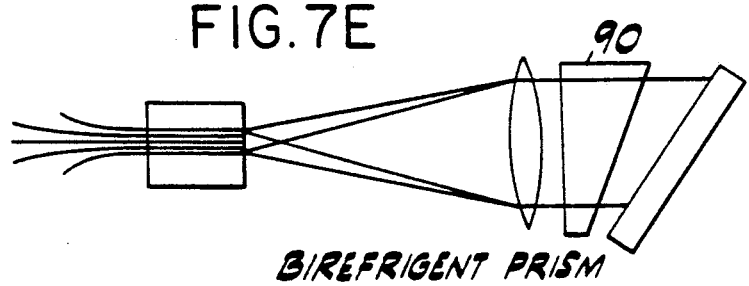
FIGS. 7E and 7F show alternative embodiments of Littrow mount transmultiplexers.
Figure 7F:
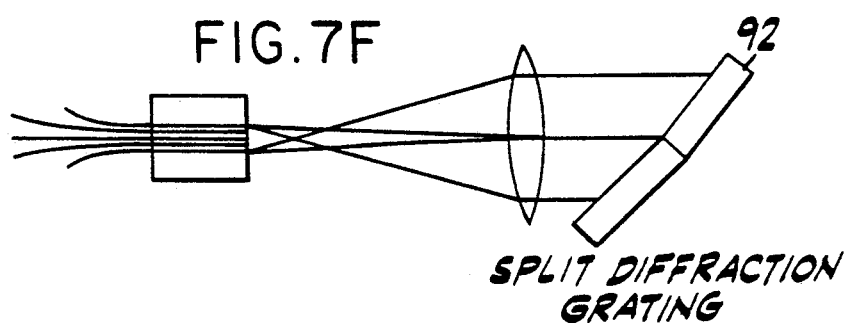

FIGS. 7E and 7F show alternative Littrow arrangements for achieving the correct transmultiplexer function of FIG. 7D independent of the number of user input and output fibers In these embodiments according to the present invention, the combining function of the external fused biconical taper couplers 37 is implemented directly in the Littrow mount structure itself. In both embodiments, the light diffracted in the transmultiplexer 14 is split into two equal components. Each component is angularly separated such that the two components strike output fiber positions displaced in fiber spacing by an amount equal to the number of fiber users. A graphic example of this is shown in FIG. 7G. The light from input fiber #1 is split into two groups, with five wavelengths 1, 2, 3, 4, and 5 in one component, and wavelengths 1', 2', 3', 4' and 5' in a second, equal component. Note that wavelength 1 and 1' are equal—the prime merely indicates that a wavelength is from the second component. Thus, the light component from input fiber #1, covering a range of five wavelengths, is imaged through the multiplexer through the range of output #5 to #1. The second component of the wavelengths are incident on a range of fiber positions displaced five fibers to the right, as seen in FIG. 7G. Similarly, if the same wavelengths (1-5) via input 5 are displaced one position to the right of the fiber 1 position, then the output positions will be displaced to the left by the same number of fiber spacings. In other words, the output of each output fiber will contain each of the five wavelengths, from one of the two components. The output of each output fiber is illustrated vertically beneath each fiber in 7G.

In FIG. 7E, the splitting of the light is produced by a birefringent prism 90 that displaces light of one polarization to the right by the correct angular amount with respect to the remaining orthogonal polarization state. In FIG. 7F, the splitting is produced by splitting the light beam arriving at the diffraction grating into two halves, an upper half and a lower half. By canting the diffraction grating 92 at a slightly different angle than the two halves, equal fractions of the incident light beam are directed into two different directions so as to be properly spaced when focused at the output image plane.

Any structure which splits a beam in the multiplexer into two equal intensity beams can be used to create the desired effect of splitting the input light intensity into two component halves, and using the half that enters the output fiber array. For example, the splitting can be performed by splitting the focusing lens into two halves and displacing one half with respect to the other, or by introducing a different prism element between the two halves (different prism angle or the same angle with a different index of diffraction, or dividing the diffraction grating into two halves) placed at slightly different angles or slightly different diffraction angles.

An alternative method for creating $N \times N$ transmultiplexers, where N is a intensity of 2, is to employ an arrangement of wavelength selective $2 \times 2$ couplers. Wavelength selective $2 \times 2$ couplers can be implemented in a variety of ways, e g., evanescent integrated optic couplers, fiber fused biconical taper couplers, multilayer dielectric films, high finesse Fabry-Perot filters, wavelength selective rotary dispersive materials, etc.

FIG. 7H is a schematic representation of a $2 \times 2$ coupler. FIG. 7H portrays how two separately distinguishable light guiding channels can be placed adjacent and closely spaced from one another for a distance much longer than a wavelength of light so that the accumulated leakage between channels permits efficient transfer of light. Under proper conditions the transfer can be as low as 0% or as high as 100%.

A $2 \times 2$ wavelength selective coupler can be used directly as a $2 \times 2$ transmultiplexer device. For such an application, it is assumed that the same two wavelengths are applied to both input ports (fibers) as shown in FIG. 7H (where the first subscript indicates source location or input port number and the second subscript indicates wavelength). In FIG. 7H, for example, wavelength 1 (first subscript) remains in the same fiber after passing through the coupler whereas wavelength 2 transfers (cross couples) from one fiber to the other. Note that this coupler provides the correct transmultiplexer function for the case $N=2$.

To implement fiber optic fused biconical taper couplers, two fibers having the cladding removed are twisted around each other, heated in the region of the twist until the fibers are soft, and the combination is pulled so that the fibers are fused and necked down to form a region in which the cores of the two fibers are closely spaced. If the taper is relatively abrupt, a wavelength selective transfer behavior is achieved such that wavelengths separated by an equal interval are efficiently coupled through from one optical channel (fiber) to the other (cross switching state) and wavelengths that are exactly intermediate remain in the same fiber (bar switching state). Proper design of the coupler, i e., the abruptness of the taper, makes possible selecting the wavelengths that are cross coupled.

Figure 7I:
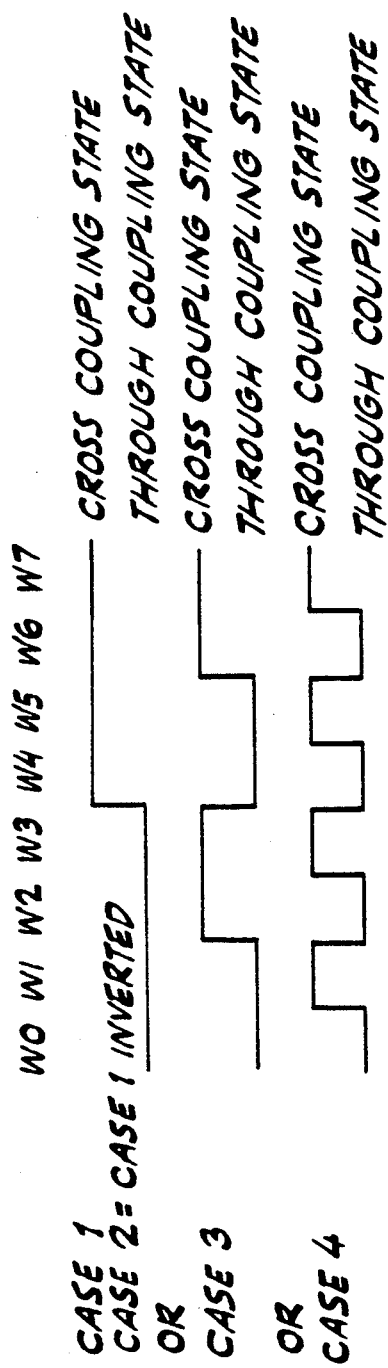
FIG. 7I is a diagram showing the wavelength response of 2×2 selective couplers.

The different types of wavelength selectivity required to implement a 4×4 transmultiplexer are as shown in FIG. 7I. These different types of wavelength selectivity are provided by different coupler types (e.g. tapers). In a 4×4 transmultiplexer, two different coupler types must be used as will be explained later.

Practical couplers typically do not exhibit the square wave response with wavelengths depicted in FIG. 7I. The type 1 (highpass) and (lowpass) coupler types can instead be implemented via dielectric coatings and, over a narrow range of wavelengths, bandpass dielectric coating fibers can be used as well. Fiber optic fused biconical taper couplers and integrated optic couplers provide a sinusiodal response as a function of wavelength which approximates the type 3 and type 4 responses. Ideal transmultiplexer transfer response is always possible for $N=2$, and the proper transfer response can be realized for the $N=4$, if one coupler stage produces a step response that divides the wavelength band of interest into two equal halves, and the second coupler stage provides a sinusoidal wavelength response that discriminates between adjacent wavelengths.

The ideal wavelength selectivity of the 2×2 coupler described above is represented in tabular form as follows:

| wavelength | W11,W21 | W12,W22 |
|---|---|---|
| coupler action | passed through on same fiber | coupled through to other fiber |

As discussed above, this type of coupling action can be realized via 1) a wavelength high pass (transmission) filter, a wavelength low pass (cross-coupling) filter, 2) a filter that performs the inverse function, or 3) and 4) filters that periodically in wavelength act as bandpass filters and band cross coupling filters. For seven equally spaced wavelengths w0-w7, the filter response can be as shown in FIG. 7I.

The filter response is given in FIG. 7I with the understanding that for each fiber one wavelength must be cross coupled and the other wavelength must be through coupled. For the 2×2 transmultiplexer, any of the four wavelength behaviors shown in FIG. 7I satisfies this condition.

Figure 7J:
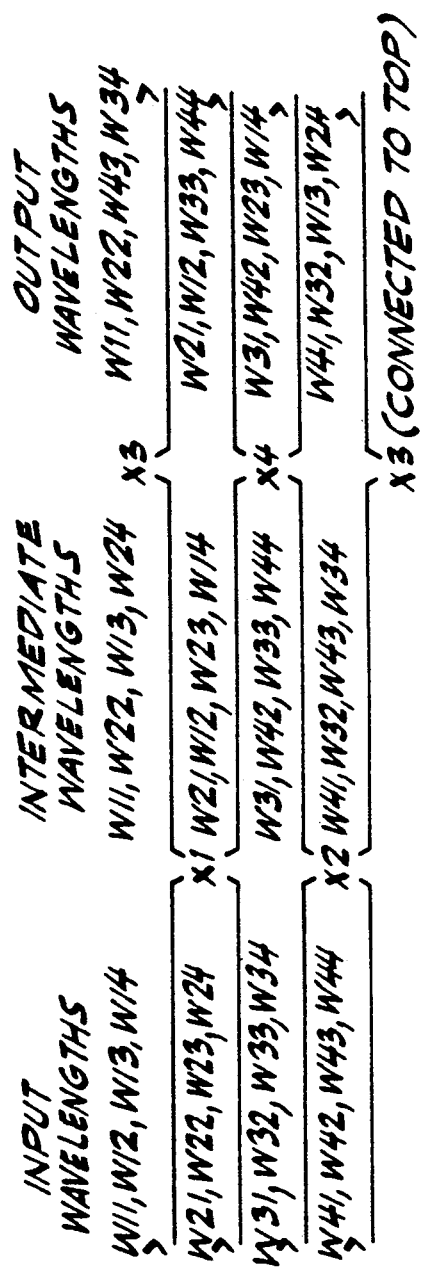
FIG. 7J is a schematic representation of a 4×4 transmultiplexer according to an embodiment of the present invention using a plurality of 2×2 selective couplers.

A 4×4 transmultiplexer is implemented using four wavelength selective 2×2 couplers as shown in FIG. 7J. The couplers designated X1 and X2, pass wavelengths 1 and 3 through the coupler and cross couple wavelengths 2 and 4. Conversely, the couplers designated X3 and X4 pass wavelengths 1 and 2 through and cross couple wavelengths 3 and 4. Thus, two distinct types of wavelength selective couplers are used in order to provide the indicated functionality of a 4×4 transmultiplexer. Also note that X1 and X2 couple between lines 1, 2 and 3, 4 whereas X3 and X4 couple between lines 1, 4 and 2, 3 respectively.

As stated earlier with respect to FIG. 4, one embodiment of the transmultiplexer architecture uses a low cost method of communication between nodes of the same group. This low cost method could be: 64 lines at 16 Mb/ ; electrical coax at 1 Gb/ (<100 m); or an 800 nm inexpensive optical link.

The above described transmultiplexer architecture included sixteen node hubs divided into four groups 6 of four nodes 2 each. While expanded architectures can be based on the described modules, the following describes the enhancements that result from an increased number of nodes per hub, the enhancements that result from interconnecting a plurality of hubs, and how simple single-channel connections can be incorporated to provide a general connect capability. These enhancement factors are independent and can be implemented separately or in combinations.

Figure 8:
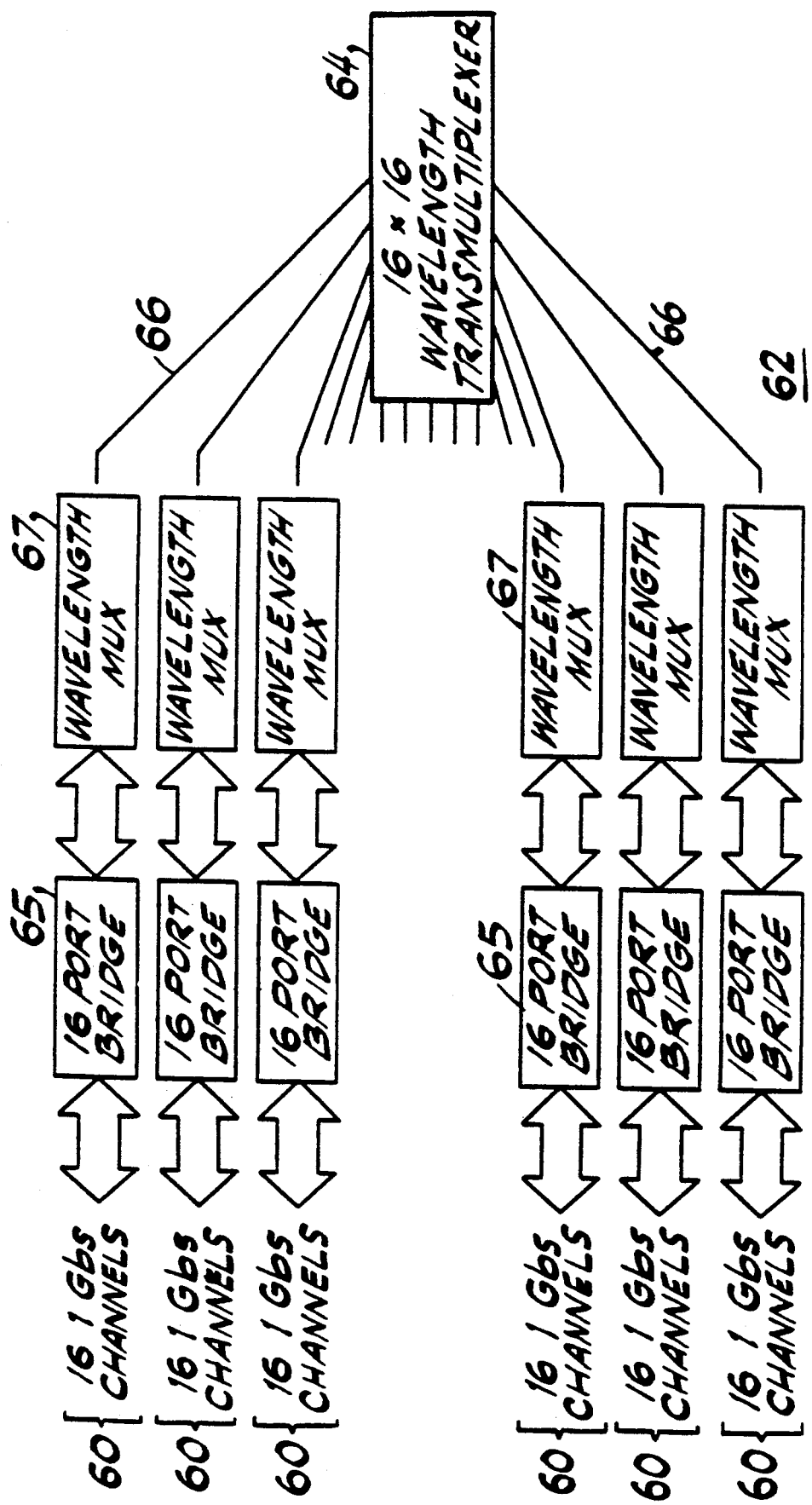
FIG. 8 is a block diagram of an expanded transmultiplexer architecture of the present invention.

FIG. 8 shows, that by providing sixteen distinct equally spaced wavelengths, a transmultiplexer network can be created having sixteen node groups 60 each connected to a transmultiplexer hub 64 via a single two fiber cable 66. The total number of nodes is 256 having a local network capacity of 256 Gb/ if the individual link capacity is 1 Gb/s. The node groups 60 are coupled to the two fiber cable 66 through a bridge 65 and 1×16 multiplexer 67.

Figure 9:
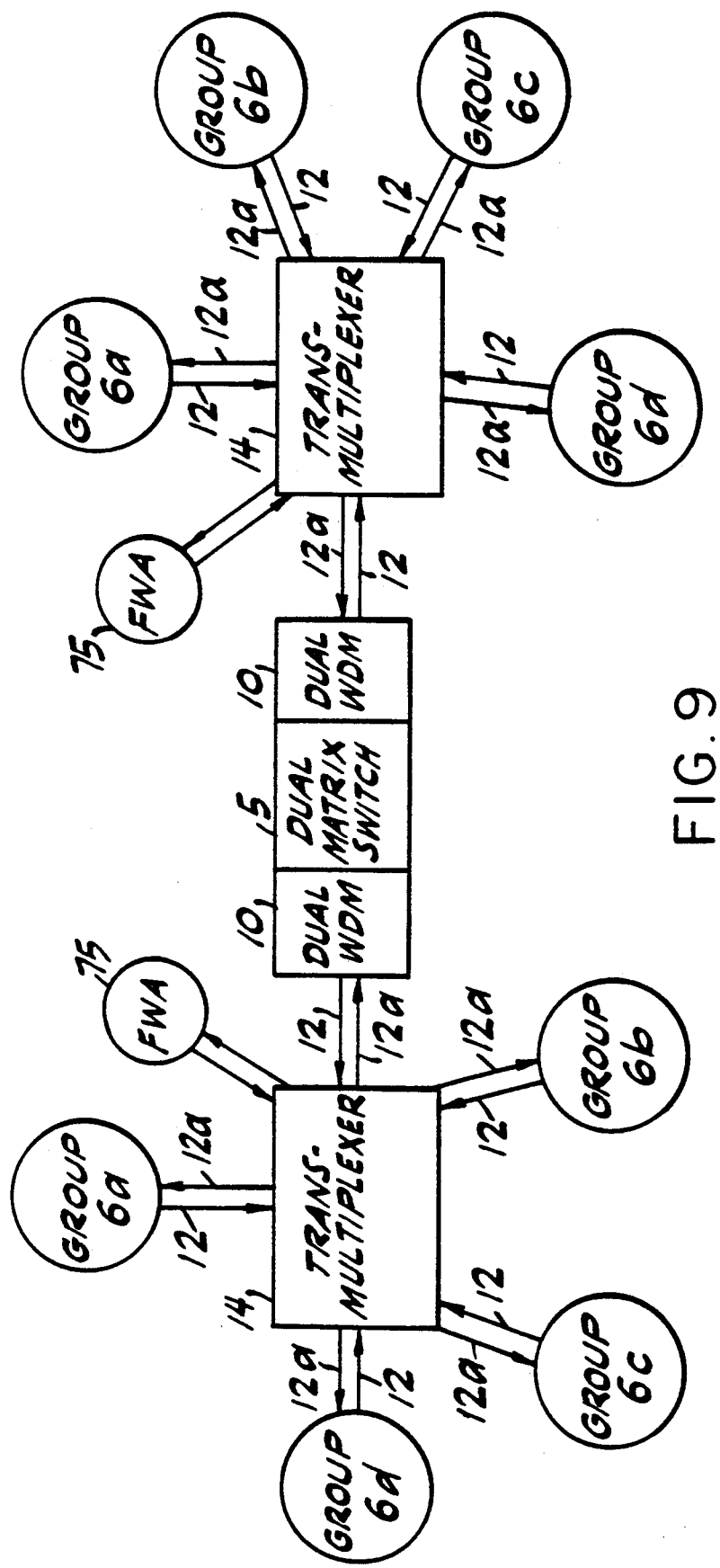
FIG. 9 is a block diagram illustrating an extension of the transmultiplexer architecture of the present invention.

FIG. 9 illustrates one example of a structure that expands the 256 node present architecture of FIG. 8. Two transmultiplexer hubs 14 are interconnected using a "sandwich" of two N port dual wavelength multiplexers 10 separated by an N×N dual matrix switch 5. This type of connection represents dual N fold communication path. Each transmultiplexer hub 14 connected to a network therefore has a spatially segmented capacity $N^2$ times the individual link capacities. Further, each hub segment of an overall network adds nearly that same segmented capacity to the complete network.

Therefore, the transmultiplexer architecture operates in the manner of a "super bus" in that the local capacity and/or throughput connection capacity is significantly greater than any individual link capacity. At the same time, the local transmultiplexer hub 14 acts as a remote bridge between additional attached network hubs.

A single user node (not shown) can be inexpensively attached to the networks through the use of fixed wavelength access (FWA) module terminations 75. The FWA terminations 75 allow the user rapid communication with one other entity attached to the same transmultiplexer hub 14. If the other entity, such as one of the groups 6a–6d, provides wavelength shifting access to all of the other nodes coupled to the hub 14, then indirect communication to any other network node is possible.

Overall, the transmultiplexer architecture using wavelength multiplexing provides a network capacity that is equal to the square of the number of wavelengths used times the bandwidth. For example, 16 distinct wavelengths provide a network capacity of 256 times the bandwidth. While the theoretical limit for wavelength multiplexing is the usable window bandwidth of the fiber, or 30,000 GHz, the transmultiplexer architecture yields a theoretical segmented network capacity of up to $1\times10^9$ GHz. This capacity is substantially larger than the wavelength of light itself In effect, the network capacity limit is the sum of the capacities of all of the fibers of the network. The transmultiplexer architecture makes more effective use of the capacities of all fiber links of the network

What is claimed is:

1. An optical transmultiplexer device, comprising:
   a) a plurality of input signal ports which carry an input signal;
   b) a plurality of output signal ports which carry an output signal;

c) means for wavelength selection from said input signal enabling a point-to-point transfer of optical signal wavelengths between the input signal and output signal ports;

d) an optic device coupled to said means for wavelength selection which provides additional focussing of said input and output signals into and from the means for wavelength selection, respectively, for efficient coupling between the input signal and output signal ports;

e) wherein said optic device comprises additional signal ports for receiving selected wavelengths from the output side of said means for wavelength selection and means for coupling the additional signal ports to selected output signal ports.

2. The optical transmultiplexer device according to claim 1 wherein the means for coupling the additional signal ports to the selected output signal ports includes a fused biconical taper coupler.

3. The optical transmultiplexer device according to claim 2 wherein said means for wavelength selection includes a Littrow mount.

4. The optical transmultiplexer device according to claim 3 wherein the optic device further comprises a mounting block adapted for coupling fibers to said input and output ports of said optical transmultiplexer device.

5. The optical transmultiplexer device comprising:
a) A plurality of N input signal ports which carry an input signal;
b) a plurality of N output signal ports which carry an output signal;
c) means for wavelength selection from said input signal enabling a point-to-point transfer of optical signal wavelengths between the N input signal and N output signal ports;
d) an optic device coupled to said means for wavelength selection which provides additional focussing of said input and output signals into and form the means for wavelength selection, respectively, for efficient coupling between the N input signal and N output signal ports;
e) wherein the means for wavelength selection comprises a Littrow mount which includes a birefringent prism.

6. The optical transmultiplexer device according to claim 5 wherein the optic device further comprises a mounting block adapted for coupling fibers to said input and output ports of said optical transmultiplexer device.

7. An optical transmultiplexer device comprising:
a) A plurality of N input signal ports which carry an input signal;
b) a plurality of N output signal ports which carry an output signal;
c) means for wavelength selection from said input signal enabling a point-to-point transfer of optical signal wavelengths between the N input signal and N output signal ports;
d) an optic device coupled to said means for wavelength selection which provides additional focussing of said input and output signals into and from the means for wavelength selection, respectively, for efficient coupling between the N input signal and N output signal ports;
e) wherein the means for wavelength selection comprises a Littrow mount which includes a split diffraction grating.

8. The optical transmultiplexer device according to claim 7 wherein the optic device further comprises a mounting block adapted for coupling fibers to said input and output ports of said optical transmultiplexer device.

9. An optical transmultiplexer device, comprising:
a) a plurality of input signal ports which carry an input signal;
b) a plurality of output signal ports which carry an output signal;
c) means for wavelength selection from said input signal enabling a point-to-point transfer of optical signal wavelengths between the input signal and output signal ports, said means for wavelength selection including a Littrow mount;
d) an optic device coupled to said means for wavelength selection which provides additional focussing of said input and output signals into and from the means for wavelength selection, respectively, for efficient coupling between the input signal and output signal ports;
e) wherein said optic device comprises additional signal ports for receiving a selected wavelength from the output side of said means for wavelength selection and returning the selected wavelength to the input side of the means for wavelength selection;
f) wherein said optic device further comprises a mounting block adapted for coupling fibers to said input and output ports of said optical transmultiplexer device.

10. An optical N×N transmultiplexer device comprising:
a) a plurality of N input signal ports which carry an input signal;
b) a plurality of N output signal ports which carry an output signal;
c) means for wavelength selection from said input signal enabling a point to point transfer of optical signal wavelengths between the input signal and output signal ports;
d) wherein said means for wavelength selection includes a wavelength selective 2×2 coupler.

11. The device of claim 10 wherein the number N of input signal ports and output signal ports is a power of 2.

12. The device of claim 11 wherein the wavelength selective 2×2 coupler comprises a fiber fused biconical taper coupler.

13. The device of claim 11 wherein the wavelength selective 2×2 coupler comprises an evanescent integrated optic coupler.

14. The device of claim 11 wherein the wavelength selective 2×2 coupler comprises a multilayer dielectric film.

15. The device of claim 11 wherein the 2×2 wavelength selective coupler comprises a high finesse Fabry-Perot filter.

16. The device of claim 11 wherein the 2×2 coupler comprises wavelength selective rotary dispersive materials.

17. The device of claim 11 wherein N is equal to 2.

18. The device of claim 11 wherein N is equal to 4.

19. The device of claim 11 wherein said means for wavelength selection includes four wavelength selective 2×2 couplers.

* * * * *